United States Patent [19]
Noda et al.

[11] Patent Number: 5,144,508
[45] Date of Patent: Sep. 1, 1992

[54] DISC CARTRIDGE LOADING DEVICE

[75] Inventors: Masayuki Noda, Kanagawa; Yukio Kobayashi, Tokyo, both of Japan

[73] Assignee: Sony Corporation, Tokyo, Japan

[21] Appl. No.: 600,834

[22] Filed: Oct. 22, 1990

[30] Foreign Application Priority Data

Oct. 24, 1989 [JP] Japan .................. 1-124286

[51] Int. Cl.5 .................. G11B 17/02; G11B 17/04
[52] U.S. Cl. .................. 360/99.06; 360/99.02
[58] Field of Search .............. 360/99.06, 99.02, 99.03, 360/99.07; 369/262

[56] References Cited

U.S. PATENT DOCUMENTS

| | | | |
|---|---|---|---|
| 4,878,139 | 10/1989 | Hasagawa et al. | 360/99.06 |
| 4,879,616 | 11/1989 | Ando | 360/99.06 |
| 4,918,553 | 4/1990 | Suzuki et al. | 360/99.06 |
| 5,005,093 | 4/1991 | Inoue et al. | 360/99.06 |

FOREIGN PATENT DOCUMENTS 0113322 7/1984 European Pat. Off. .
0159591 10/1985 European Pat. Off. .

Primary Examiner—David J. Severin
Attorney, Agent, or Firm—Lewis H. Eslinger; Jay H. Maioli

[57] ABSTRACT

A disc cartridge loading device for loading a disc cartridge onto a disc drive device includes a retention lever having an engaging portion engaging a recess of the disc cartridge and mounted on a cartridge holder for rotation and movement in the disc cartridge inserting-discharging direction, a spring for biasing the retention lever into rotation in a direction of engagement of the engaging portion with the recess and also into movement in the disc cartridge inserting direction, and an engagement releasing mechanism for rotating the retention lever for releasing the engagement of the engaging portion with the recess up on movement of the retention lever in the disc cartridge discharging direction for halting the disc cartridge at a predetermined position during ejection of the disc cartridge.

6 Claims, 7 Drawing Sheets

DISC CARTRIDGE LOADING DEVICE

BACKGROUND OF THE INVENTION

1. Field of the Invention

This invention relates to a disc cartridge loading device for loading a disc cartridge into a disc drive unit. More particularly, it relates to a disc cartridge loading device which is provided with a cartridge holder for insertion and holding of a disc cartridge therein and an ejection mechanism for ejecting the disc cartridge from the cartridge holder during unloading, whereby the disc cartridge may be retained in the state in which it partially protrudes from the cartridge holder during unloading of the disc cartridge from the cartridge holder.

2. Description of the Related Art

There has been proposed a disc cartridge comprised of a disc used as a recording medium, such as an optical disc, magneto-optical disc or a magnetic disc, which is contained in a cartridge for protection against possible damage or for preventing the dust and dirt from being deposited on the disc surface.

A disc apparatus adapted for recording and/or reproducing information signals on or from a disc contained in such cartridge includes a disc cartridge loading device for loading the disc on a disc table of a disc driving unit adapted for rotationally driving the disc.

This disc cartridge loading device is so constructed and arranged that, when the disc cartridge is inserted by way of a disc inserting/discharging opening, a cartridge holder holds the disc cartridge, so that the disc may be placed on the disc table by shifting this cartridge holder towards the disc table. The disc cartridge loading device has an ejection mechanism whereby the cartridge holder is moved in a direction away from the disc table and the disc cartridge in the cartridge holder is also moved to discharge the disc cartridge outwards by way of the disc inserting/discharging opening.

With such disc cartridge loading device, there is the risk that the disc be ejected suddenly out of the disc drive device through the inserting-discharging opening. If the disc cartridge is ejected in this manner, the disc cartridge may be injured as a result of the sudden descent.

There has been proposed a disc cartridge attachment device in which the disc cartridge is halted and retained at the time of ejection of the disc cartridge with the disc cartridge partially protruding out of the disc inserting-discharging opening.

The disc cartridge loading device includes a rotary member supported for rotation by a supporting shaft extending orthogonally to the inserting-discharging direction of the disc cartridge. This disc cartridge loading device is so constructed and designed that the rotary member is rotated during ejection of the disc cartridge as a result of the movement of the disc cartridge towards the disc inserting-ejection opening to cause one end of the rotary member to abut on the lateral surface of the disc cartridge to halt the disc cartridge under the frictional force acting between the one end of the rotary member and the lateral side of the disc cartridge.

However, with the above described disc loading device in which the ejected disc cartridge is halted and retained in the state of being partially protruded out of the disc inserting-ejection opening, it is difficult to maintain the ejected disc cartridge at a predetermined halt position since the frictional coefficient between the one end of the rotary member and the outer surface of the disc cartridge differs with the material of the disc cartridge or with the state of surface processing of or the wear caused to disc cartridge.

In addition, with such disc cartridge loading device, the halt position of the ejected disc cartridge when the disc cartridge loading device is mounted in the horizontal position for inserting the disc cartridge in the horizontal position may differ from that when the disc cartridge loading device is mounted in the vertical position for inserting the disc cartridge in the vertical position.

OBJECT AND SUMMARY OF THE INVENTION

It is therefore an object of the present invention to provide a disc cartridge loading device in which the disc cartridge ejected out of the disc loading device within the disc drive unit during ejection of the disc cartridge may be halted at an accurately preset position.

It is another object of the present invention to provide a disc cartridge loading device in which the disc cartridge may be positively halted at a preset position.

For accomplishing the above objects, the present invention provides a disc cartridge loading device comprising a cartridge holder for insertion and holding of a disc cartridge therein, an ejection mechanism for shifting the disc cartridge in an ejecting direction opposite to the inserting direction for ejecting the disc cartridge out of the cartridge holder, a retention lever supported for movement in an inserting-ejecting direction and for rotation within the cartridge holder and having an engaging portion for engagement with an engaging recess in the disc cartridge, a spring for biasing the retention lever into the inserting direction and into rotation in a direction in which the engaging portion engages in the engaging recess of the disc cartridge, and an engagement releasing mechanism for rotating the retention lever on movement of the retention lever in the direction of ejection of the disc cartridge out of the cartridge holder for releasing the engagement between the engaging portion and the engaging recess.

With the above described disc cartridge loading device, the retention lever that is rotationally biased by a spring has its engaging portion engaged in the engaging recess of the ejected disc cartridge to halt the disc cartridge. When the so-halted disc cartridge is further moved in the discharging direction, the retention lever is moved along with the disc cartridge so that the engagement releasing mechanism releases the engagement between the engaging portion and the engaging recess.

The above and other objects and advantages of the present invention will become more apparent from the following detailed description of the invention especially when read in conjunction with the accompanying drawings.

DETAILED DESCRIPTION OF PREFERRED EMBODIMENT

The disc cartridge loading device of the present invention is used in a disc driving device adapted for recording and/or reproducing information signals on or from a disc accommodated in a disc cartridge. The disc cartridge loading device is used for attaching and holding the disc cartridge at a disc loading position which will allow the information signals to be recorded or reproduced by the disc driving device.

Figure 11:
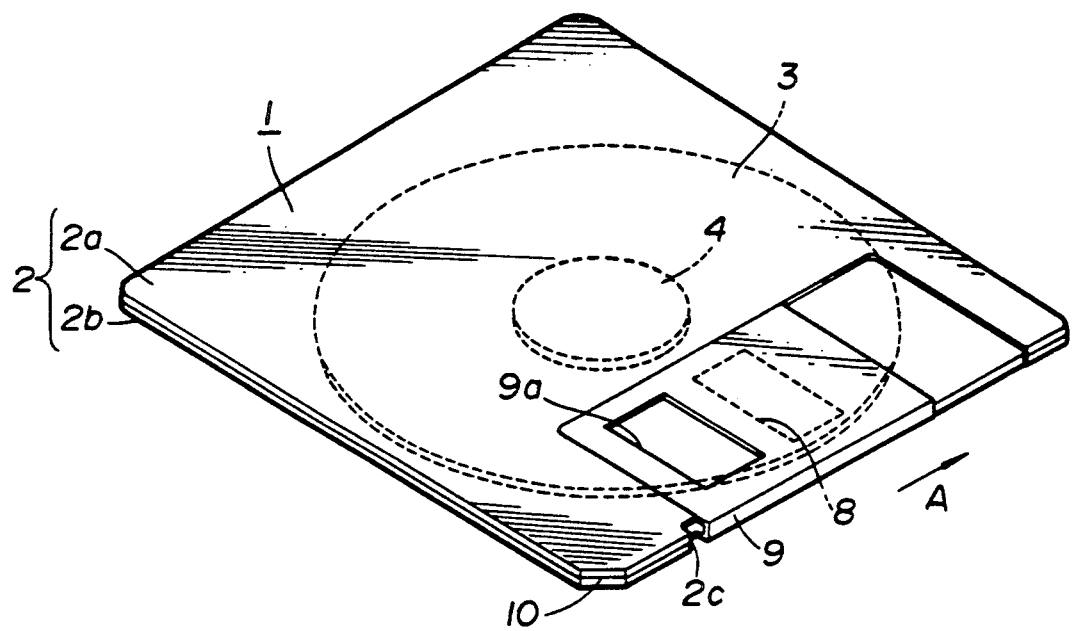
FIG. 11 is a perspective view showing the disc cartridge loaded by the disc cartridge loading device into the disc drive unit.
Figure 12:
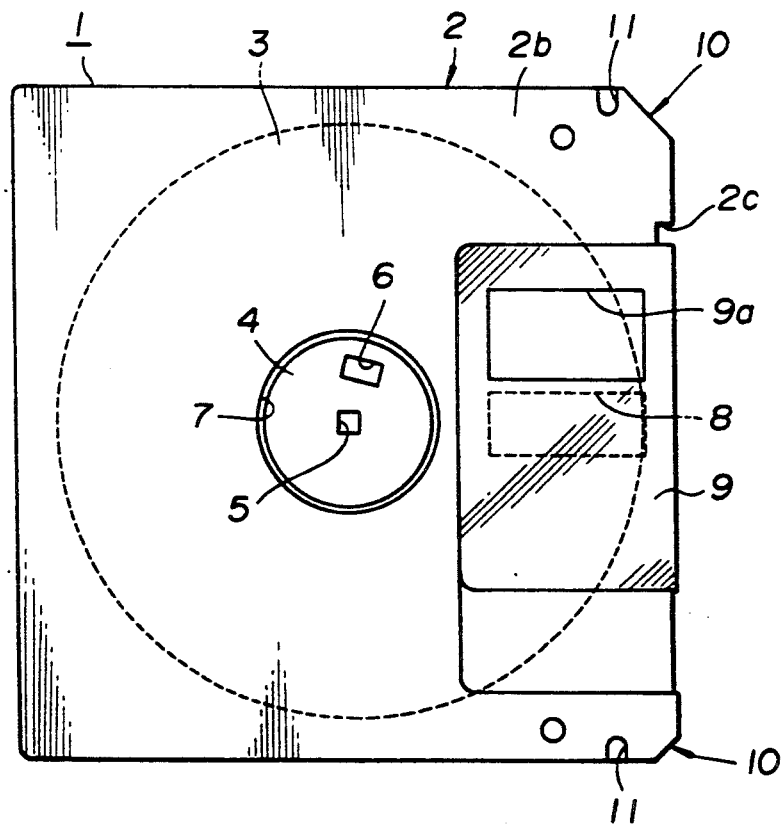
FIG. 12 is a bottom view showing the disc cartridge shown in FIG. 11.

The construction of the disc cartridge which will be loaded by this disc loading device to the disc driving device will first be explained. Referring to FIGS. 11 and 12, the disc cartridge 1 includes a cartridge body 2 consisting of an upper cartridge half 2a and a lower cartridge half 2b abutted and connected to each other, and a sheet-like magnetic disc 3 rotatably accommodated within the cartridge body 2.

A disc-shaped central core 4 formed of metal or synthetic resin is secured at the center of the disc 3. This central core 4 has a central opening 5 and a driving pin inserting opening 6 at a position offset from its center. The central core 4 is exposed towards outside by means of a disc table inserting opening 7 provided at the center of the lower cartridge half 2b.

Magnetic head inserting openings 8 are provided in the upper and lower cartridge halves 2a and 2b for exposing both sides of the magnetic disc 3 along the radius and between the inner and the outer peripheries of the disc. These magnetic head inserting openings 8 may be opened or closed by a shutter 9. The shutter 9, formed by a thin metal or synthetic resin plate, is bent in the form of a letter U when seen in cross-section, and is mounted for clamping the cartridge body 2 by its arms for closing the magnetic head inserting openings 8. The shutter 9 may be moved along the side edge of the cartridge body 2 and is provided with an opening 9a which is of the size and shape corresponding to those of the magnetic head inserting openings 8 so as to coincide with the magnetic head inserting openings 8 when the shutter has been moved in the direction towards the one side shown by an arrow A in FIG. 11. When the shutter 9 is not in use, it is biased by biasing means, not shown, towards the other side or in the direction opposite to the direction shown by the arrow A in FIG. 11 for closing the magnetic head inserting openings 8 during such non-use time. A notch 2c for opening the shutter is formed at a position on the rim of the cartridge body 2 which is adjacent to the other side of the shutter 9 during non-use of the shutter 9.

The cartridge body 2 has tapered side corners 10 on the side of the head inserting openings 8 which is the forward side when the cartridge body 2 is introduced into the disc cartridge loading device. Engaging recesses 11, 11 are formed on both lateral sides towards the front of the lower cartridge half 2b.

Figure 1:
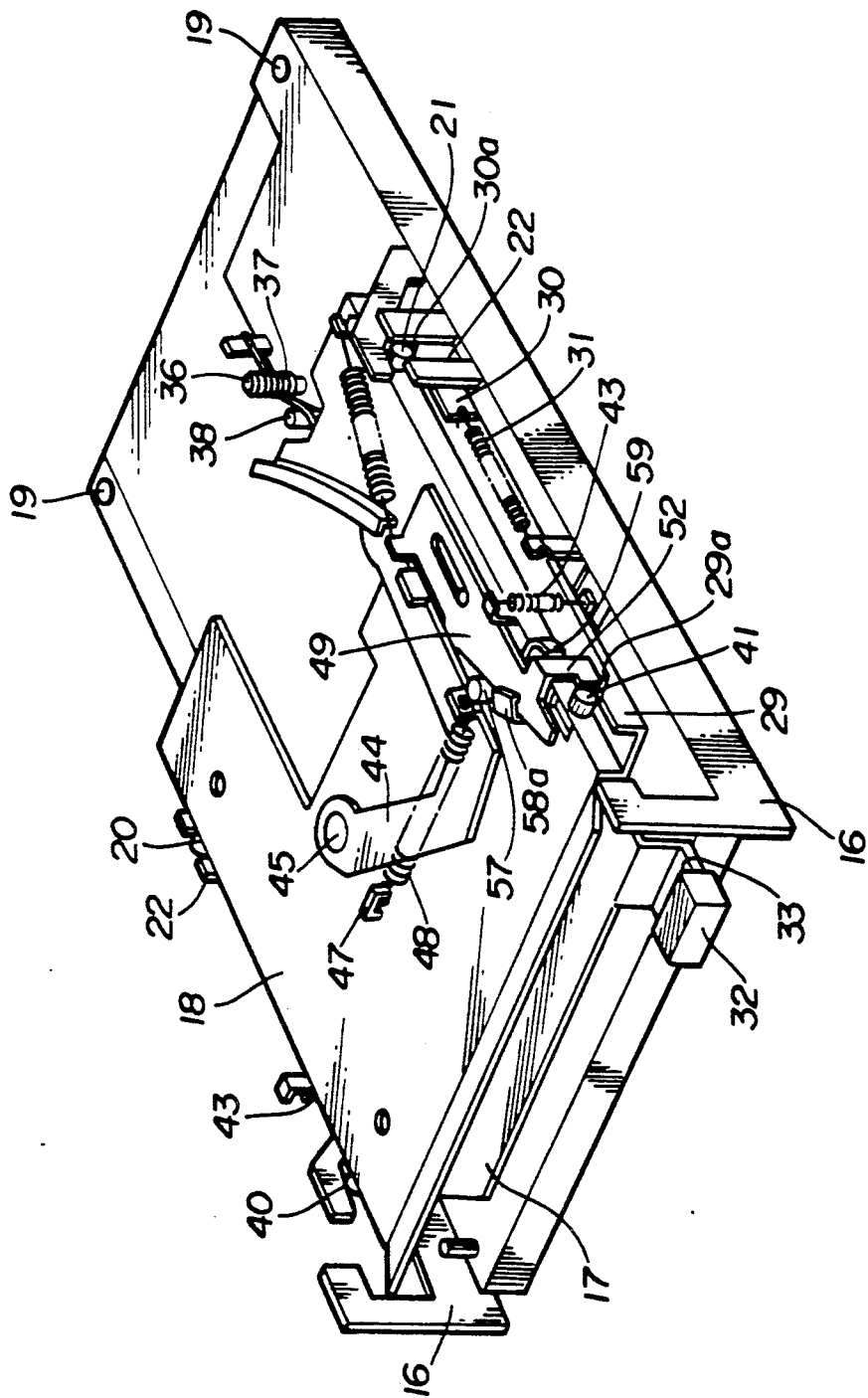
FIG. 1 is a perspective view showing a disc cartridge loading device according to the present invention.
Figure 2:
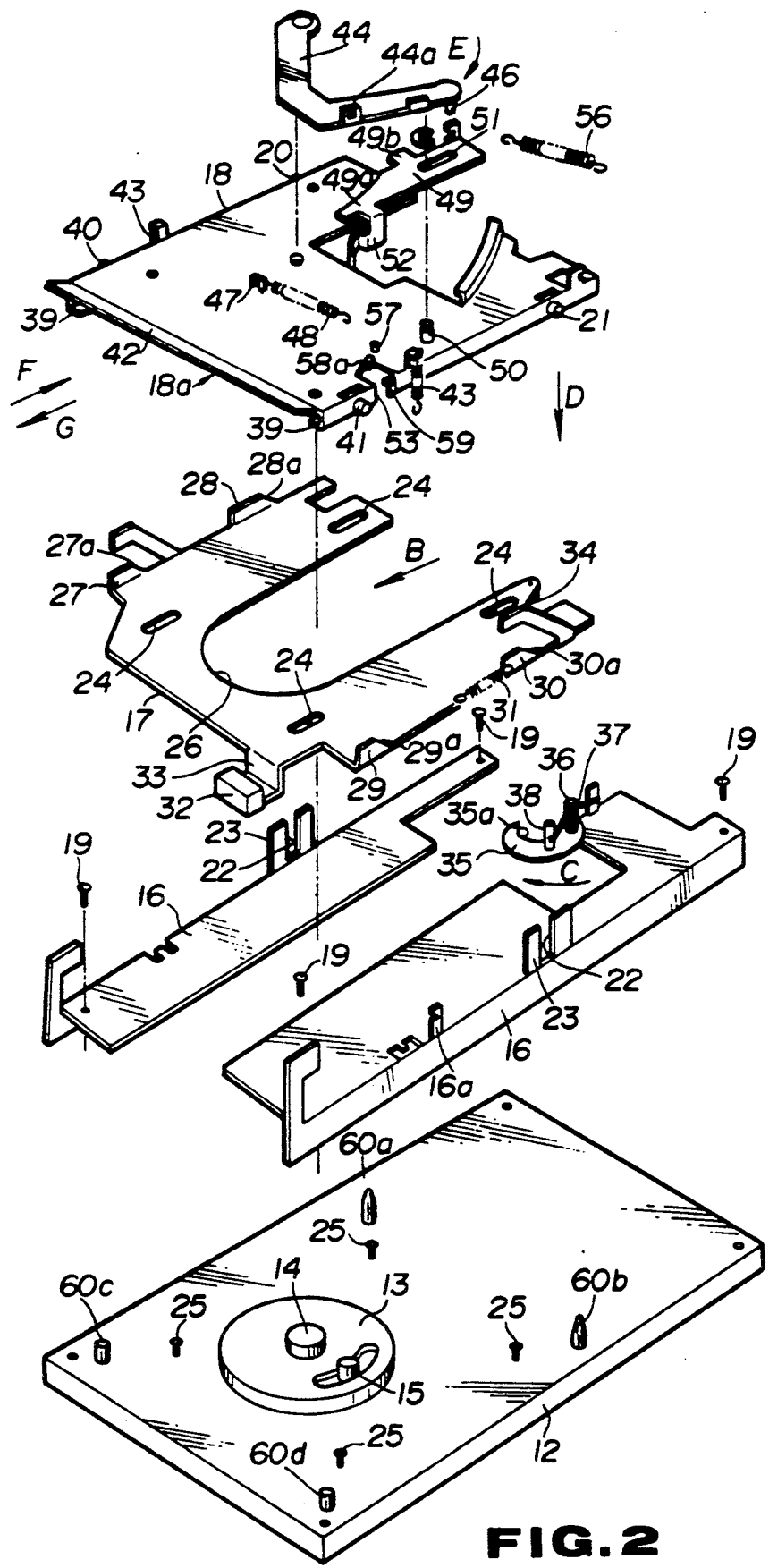
FIG. 2 is an exploded perspective view showing the disc cartridge loading device shown in FIG. 1.

Referring to FIGS. 1 and 2, the disc cartridge loading device of the present invention, for loading the above described disc cartridge 1 to the disc driving device, is constituted by a chassis 12 and a disc table 13 rotatably supported on the chassis 12. The disc table 13 is adapted to be rotated by a driving motor, not shown, provided on the lower surface of the chassis 12. An upstanding central pin 14 is provided on the disc table 13 and an upstanding driving pin 15 is provided thereon at a position offset from the central pin 14.

On the chassis 12, there are formed positioning pins 60a, 60b and height setting pins 60c, 60d adapted for positioning the disc cartridge 1 in abutment on the cartridge body 2 when the disc cartridge 1 has been loaded in position within the disc cartridge loading device.

A pair of side plates 16 are provided for facing both lateral sides of the chassis 12. An ejection plate 17 is mounted between these sides plates 16 for sliding in the fore and aft direction with respect to the chassis 12. On the ejection plate 17, there is mounted a cartridge holder 18 forming a housing section 18a for the disc cartridge 1.

The side plates 16 are secured to the chassis 12 by a number of set screws 19. These side plates 16 are formed with guides 23, such as by bending, so that these guides are directed upwards towards both sides of the chassis 12. Each of the guides 23 has a guide groove 22 into which are engaged guide pins 20, 21 projecting laterally outwardly from the rearward lateral sides of the cartridge holder 18. This guide groove 22 extends in a direction orthogonal to the longitudinal direction of the chassis 12.

The ejection plate 17 has a pair of elongated openings 24 on each lateral side into which four positioning pins 25 formed on the chassis 12 are inserted so that the ejection plate may be slidable in the fore and aft direction within the extent delimited by the long diameter of the opening 24.

The ejection plate 17 is formed with a central notch 26 which is opened towards the rear side so that a magnetic head device, not shown, placed at the rear side of the chassis 12 and the disc table 13 may face towards above. On both lateral sides of the ejection plate 17, there are formed upstanding cam plates 27, 28, 29 and 30 for bringing the cartridge holder 18 into and out of contact with the chassis 12. These cam plates 27, 28, 29 and 30 are formed with rearwardly inclined cam surfaces 27a, 28a, 29a and 30a, respectively.

The ejection plate 17 is biased in a forward direction as shown by an arrow B in FIG. 2 by a tension coil spring 31 which is installed between the lateral side of the ejection plate 17 and a lug 16a formed in the side plate 16. A bent projection 33 for attaching an ejection button 32 is formed at one forward lateral side of the ejection plate 17.

A locking pin 34 is formed on the rear lower surface of the ejection plate 17. When the ejection plate 17 is at the rearward ejection position, the locking pin 34 is engaged with a locking lever 35 supported by the side plate 16 for locking the ejection plate 17 at the ejecting position. The locking lever 35 is rotatably supported by a supporting shaft 36 mounted upright on the side plate 16 so as to be perpendicular to the chassis 12. A hook-shaped engaging end 35a of the locking lever 35 is rotationally biased in a direction towards the locking pin 34 as shown by an arrow C in FIG. 2 by a torsion coil spring 37 which is coiled around the supporting shaft 36 and which has its one arm engaged with the side plate 16 and its other arm engaged with the locking lever 35. An actuating pin 38 pressed by disc cartridge 1 introduced into the cartridge holder 18 is formed on the locking lever 35. This locking lever 35 constitutes an ejection means for locking the ejection plate 17 in the ejecting position and also thrusting the disc cartridge 1 for taking out or discharging the disc cartridge in the forward direction as shown by an arrow G in FIG. 2.

The cartridge holder 18 is formed as a flat plate about equal in size to the disc cartridge 1, and a pair of L-shaped slide guide walls 39, 39 are formed on the lateral sides of the cartridge holder 18 for defining the housing section 18a adapted for accommodating and holding the disc cartridge 1. The forward side of the cartridge holder 18 is formed with an inclined guide surface 42 to permit the disc cartridge 1 to be easily introduced therein in the inserting direction shown by an arrow F in FIG. 2. When introduced into the housing section 18a the disc cartridge 1 is maintained with the overall outer lateral side of the lower cartridge half 2b facing the chassis 12.

Guide pins 40, 41 similar to guide pins 20, 21 are formed on the forward outer lateral sides of the cartridge holder 18. These guide pins 20, 21, 40 and 41 are provided in association with cam plates 27, 28, 29 and 30 of the ejection plate 17. The cartridge holder 18 is placed on the ejection plate 17 with the rearward guide pins 20, 21 engaged in the guide grooves 22 and with the guide pins 20, 21, 40 and 41 resting on the cam plates 27, 28, 29 and 30. The cartridge holder 18 is biased in a direction towards the chassis 12, as shown by an arrow D in FIG. 2, by a pair of tension coil springs 43, installed between both sides of the cartridge holder 18 and both sides of the side plates 16.

On the upper surface of the cartridge holder 18, an L-shaped shutter opening-closing lever or shutter operating lever 44 is mounted for rotation within a plane parallel to the upper surface of the cartridge holder 18. This shutter operating lever 44 has its proximal end rotatably supported by a supporting shaft 45 formed on cartridge holder 18 and has its distal end protruding rearwardly beyond the rear edge of the cartridge holder 18. A shutter opening pin 46 is formed on the distal end of the shutter operating lever 44 for extending towards the chassis 12. The shutter operating lever is rotationally biased in a direction in which the shutter opening pin 46 abuts on the rear end of the cartridge holder 18, as shown by an arrow E in FIG. 2, by a tension coil spring 48 installed between a projection 44a on the lever 44 and a projection 47a on the upper surface of the cartridge holder 18. The shutter opening pin 46, positioned in abutment on the rear end of the cartridge holder 18, is adapted to be fitted into the shutter opening notch 2c of the disc cartridge 1 introduced into the housing section 18. This shutter operating lever 44 constitutes an ejection means for thrusting and taking out the disc cartridge 1 forwardly as shown by an arrow G in FIG. 2.

Figure 3:
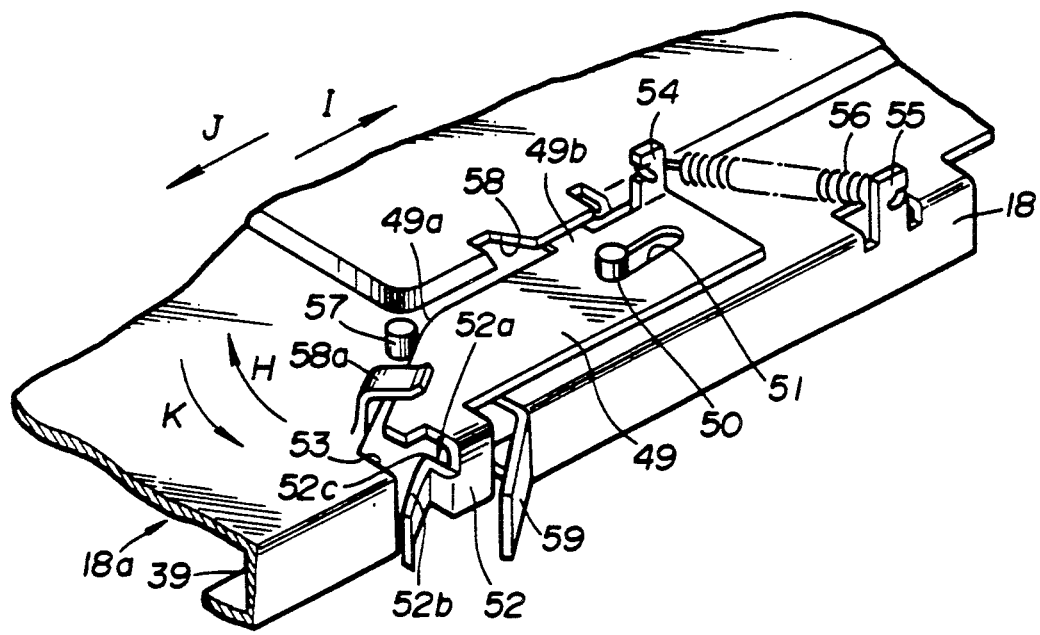
FIG. 3 is an enlarged perspective view showing a retention lever and associated portions of the disc cartridge loading device shown in FIG. 1.

A retention lever 49 is mounted on the upper surface towards one lateral side of the cartridge holder 18 for transiently retaining the disc cartridge 1 ejected by the ejection mechanism from the cartridge holder 18, as shown in FIGS. 1 to 3. An elongated through-hole 51 is formed in the retention lever 49 so that its long axis lies in the fore and aft direction or in the direction of insertion and ejection of the disc cartridge 1. The retention lever 49 has a retention lever supporting pin 50 on the cartridge holder 18 introduced in through-hole 51 so that the retention lever 49 is slidable in the fore and aft direction while being rotatable about the retention lever supporting pin 50.

The retention lever 49 has a retention arm 52 functioning as an engaging portion engaging with the recess 11 of the disc cartridge 1. This engaging arm 52 is formed at the forward side of the lever 49 and bent towards the chassis 12 for facing the inside of the housing section 18a by means of a retention opening 53 formed on one lateral side of the cartridge holder 18. This retention arm 52 has its distal end bent for extending into the inside of the housing section 18a to form a retention projection 52c. This retention projection 52c has a rearward retainer 52a and a forward tapered surface 52b. The rear surface of the retainer 52a extends at right angles with the disc cartridge inserting and discharging direction. The forward surface of the tapered surface 52b is tapered so that its forward side rather than its rear side connecting to the retainer 52a lies outside of the housing section 18a.

A tension coil spring 56, functioning as biasing means, and installed between a retainer 54 on the rear side of the lever 49 and a retainer 55 on the rearward lateral side of the cartridge holder 18, operates for rotationally biasing the lever 49 in a direction in which, as shown by an arrow H in FIG. 3, the retention arm 52 is engaged in the recess 11, while also operating for thrusting the lever 49, as shown by an arrow I in FIG. 3, that is, in a rearward direction, or in the direction of inserting the disc cartridge 1.

On the upper surface of the cartridge holder 18, a disengaging pin 57 constituting an engagement releasing mechanism is formed in operative association with the retention opening 53 for facing the forward lateral side of the retention lever 49. This disengaging pin 57 is provided at a position further away from the forward end of the retention lever 49 towards or into the inside of the cartridge holder 18. The forward lateral side of the lever 49 facing the disengaging pin 57 is formed as a cam surface 49a also constituting an engagement releasing mechanism. This cam surface 49a is tapered so that its rear side rather than its front side is disposed more inwardly within the inside of the housing section 18. The engagement release mechanism, constituted by disengaging pin 57 and cam surface 49a, is so constructed that, when the retention lever 49 is moved forwards as shown by an arrow J in FIG. 3, the cam surface 49a is moved along the disengaging pin 57, so that the arm 52 causes the lever 49 to be rotated towards outside of the housing section 18, as shown by an arrow K in FIG. 3 to release the engagement between the projection 52c and the engaging recess 11.

The retention lever 49 has a lug 49b on its lateral surface for intrusion into a recess 58 on the cartridge holder 18 to prevent disengagement of the lever 49 from cartridge holder 18. A limiting tongue 54 for limiting the movement of the retention lever 49 in a direction away from cartridge holder 18 and a limiting tongue 59 for limiting the rotation of the forward end of the lever 49 in a direction away from cartridge holder 18 are provided on the cartridge holder 18 at a position generally coinciding with the foremost part of the retention lever 49.

Figure 4:
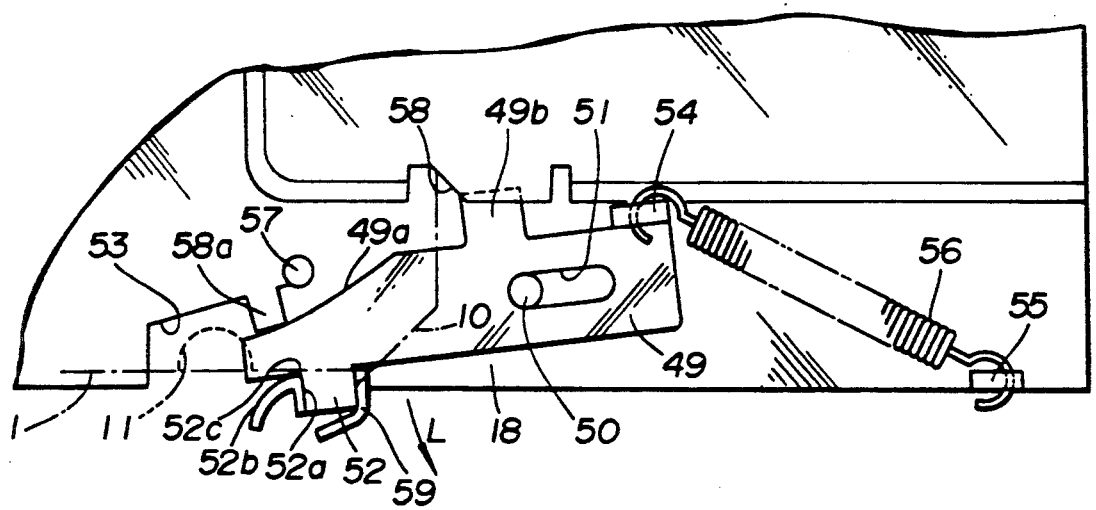
FIG. 4 is an enlarged plan view showing the retention lever and associated portions in the state of insertion of the disc cartridge into the loading device.

With the above described disc cartridge loading device of the present invention, when the disc cartridge 1 is introduced into the housing section 18a of the cartridge holder 18 from the forward side, as shown by an arrow F in FIG. 2, the tapered portion 10 of the cartridge body 2 abuts on the tapered surface 52b of the retention lever 49, as shown in FIG. 4, so that the retention lever 49 is rotated against the force of the tension coil spring 56 in a direction in which the retention arm 52 is directed towards the outside of the housing section 18a, as shown by an arrow L in FIG. 4. At this time, the retention projection 52c facing the interior of the housing section 18a of the retention arm 52 abuts on the edge of the cartridge body 2.

Figure 5:
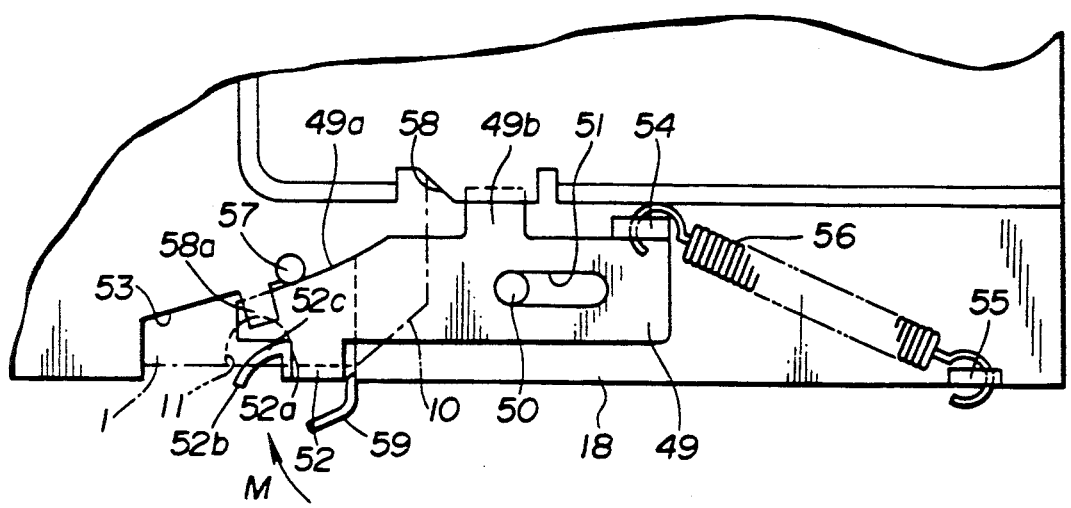
FIG. 5 is an enlarged plan view showing the retention lever and associated portions in the state in which the engaging portion of the retention lever is engaged with the engaging recess of the disc cartridge.
Figure 7:
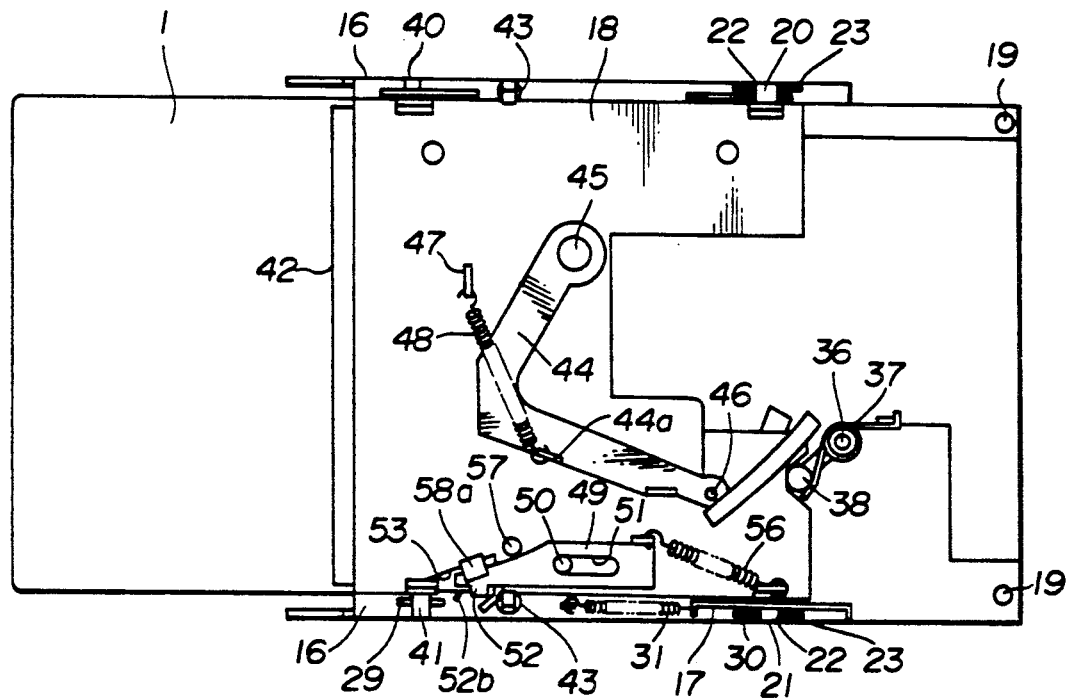
FIG. 7 is a plan view showing the state in which the engaging portion on the side of the disc cartridge loading device is engaged with the engaging recess of the disc cartridge.
Figure 8:
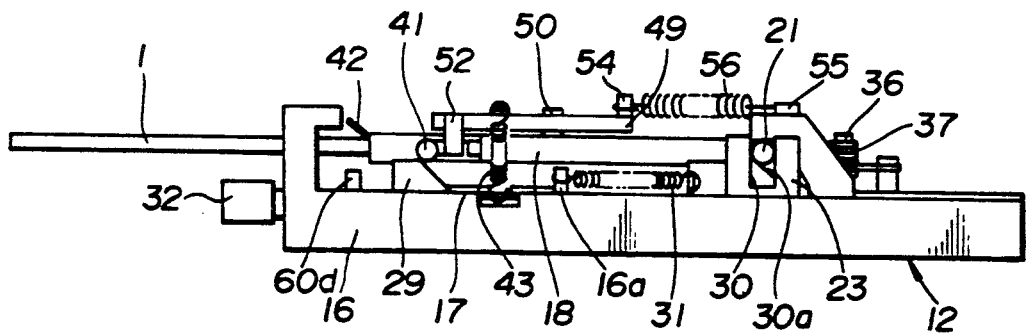
FIG. 8 is a side elevational view showing the state in which the engaging portion on the side of the disc cartridge loading device is engaged with the engaging recess of the disc cartridge.

When the disc cartridge 1 is further introduced into the inside of the housing section 18a, and the retention projection 52c faces the engaging recess 11, the retention lever 49 is turned, under the force of the tension coil spring 56, in a direction of an arrow M in FIG. 5 in which the projection 52c is directed towards the inside of the housing section 18a, as shown in FIGS. 5 and 7, the retention projection 52c protruding into the engaging recess 11. At this time, the cartridge holder 18 is at a position spaced apart frm chassis 12, as shown in FIG. 8, with the foremost parts of the cam plates 27, 28, 29 and 30 abutting on the guide pins 20, 21, 40 and 41.

When the disc cartridge 1 is further introduced, the tapered surface 52b of the retention projection 52c abuts on the lateral edge of the engaging recess 11, the retention lever 49 being turned in a direction in which the engaging arm 52 is directed towards the outside of the housing section 18a to release the engagement between the retention projection 52c and the recess 11. When the disc cartridge 1 is further introduced into the interior of the housing section 18a, with the retention projection 52c abutting on the lateral edge of the cartridge body 2, the shutter opening pin 46 intrudes into the shutter opening notch 2c, while the shutter actuating lever 44 is turned for shifting the shutter 9 in a direction of opening the head insertion opening 8.

Figure 9:
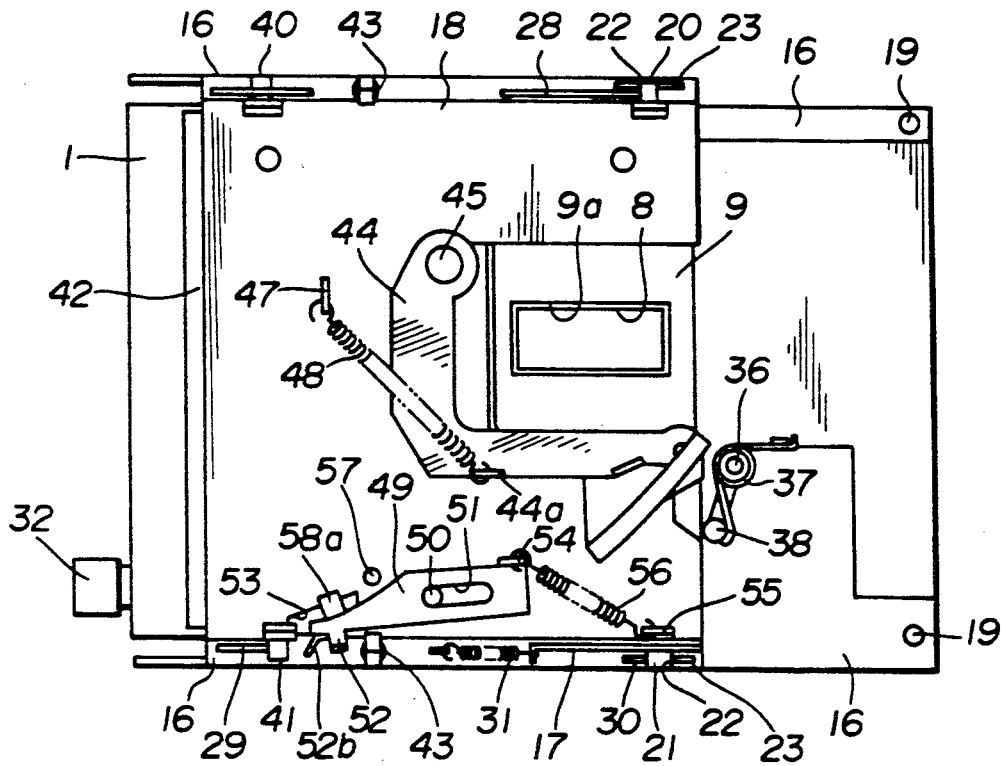
FIG. 9 is a plan view showing the state in which the loading of the disc cartridge by the disc cartridge loading device has been terminated.
Figure 10:
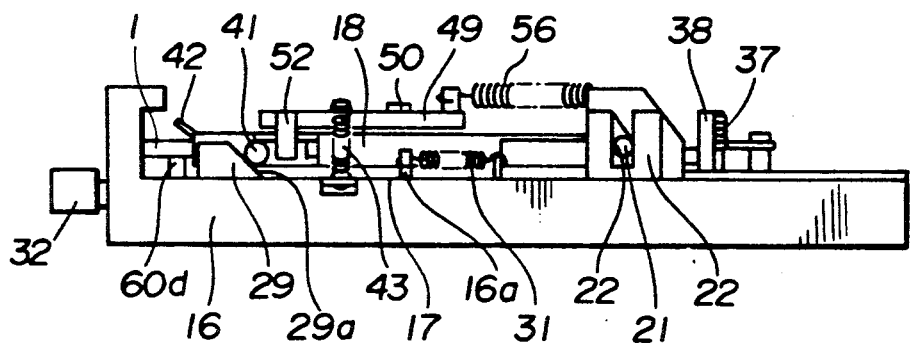
FIG. 10 is a side elevational view showing the state in which the loading of the disc cartridge by the disc cartridge loading device has been terminated.

When the disc cartridge 1 is introduced to a position in which the central core 4 faces the disc table 13, the cartridge body 2 thrusts the pin 38 to turn the locking lever 35 to release the engagement between the locking lever 35 and the locking pin 34. Then, as shown in FIGS. 9 and 10, the ejection plate 17 is moved forwards under the force of the tension coil spring 31. The cartridge holder 18 is moved towards the chassis 12, under the bias of the tension coil spring 43, with the guide pins 20, 21, 40 and 41 sliding along the inclined cam surfaces 27a, 28a, 29a and 30a. The cartridge body 2 is positioned and held by being clamped by the foremost part of each positioning pin 60 and the cartridge holder 18. At this time, since the central core 4 rests on the disc table 13 and the central pin 14 and the driving pin 15 penetrate into the central opening 5 and the driving pin inserting opening 6, respectively, the magnetic disc 3 is turned by the rotational operation of the disc table 13. At this time, the magnetic disc 3 is brought into sliding contact with a magnetic head of the magnetic head device, not shown, for recording and/or reproducing information signals on or from the head device.

For ejecting the thus loaded disc cartridge 1 from the disc cartridge attachment device, the ejecting button 32 is pressed to shift, the ejecting plate 17 towards the rear. The cartridge holder 18 is then moved in a direction away from chassis 12, against the bias of the tension coil springs 43, with the guide pins 20, 21, 40 and 41 sliding along the inclined cam surfaces 27a, 28a, 29a and 30a. At this time, the cartridge body 2 is released from retention by the foremost parts of the positioning pins 60 and the cartridge holder 18 so as to be moved in the discharging direction shown by an arrow G in FIG. 2, under the bias of the torsion coil spring 37 and the tension coil spring 48, by means of the locking lever 35 and the shutter actuating lever 44 constituting the ejection mechanism. With the cartridge body 2 thus moved in the discharging direction, the shutter actuating lever 44 is turned under the bias of the tension coil spring 48, the shutter 9 being moved in a direction of closing the head inserting opening 8. As the cartridge body 2 is moved in the discharging direction, the locking lever 35 is turned under the bias of the torsion coil spring 37 for engaging the engaging end 35a in the locking pin 34 to lock the ejecting plate 17 in the ejecting position.

When the disc cartridge 1 reaches the position in which the retention projection 52c faces the engaging recess 11, as shown in FIGS. 5 and 7, the retention lever 49 is turned under the bias of the tension coil spring 56, with the retention projection 52c intruding into the engaging recess 11. Since the rear surface of the retainer 52a is nearly perpendicular to the direction of movement of the disc cartridge 1, the disc cartridge 1 is halted in a state in which the retainer 52a abuts on the inner wall of the engaging recess 11.

Figure 6:
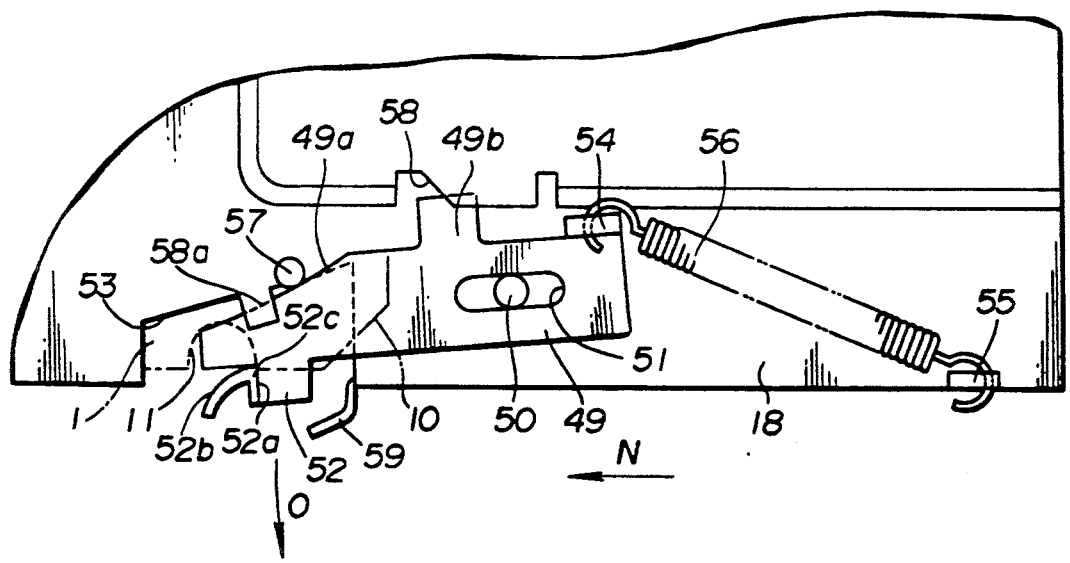
FIG. 6 is an enlarged plan view showing the retention lever and associated portions in the state in which the engaging portion of the retention lever is disengaged from the engaging recess of the disc cartridge.

When one tries to extract the disc cartridge 1 towards the outside of the disc cartridge attachment device, the retention lever 49 is moved forwards, against the bias of the tension coil spring 56, as shown by an arrow N in FIG. 6, with the cam surface 49a sliding along the disengaging pin 57. The retention lever 49 then is turned, against the bias of the tension coil spring 56, in a direction in which the engaging arm 52 is directed towards the outside of the housing section 18, as shown by an arrow 0 in FIG. 6. This releases the engagement between the retention projection 52c and the engaging recess 11 to permit the disc cartridge 1 to be taken out of the attachment device.

It is to be noted that the disc cartridge loading device of the present invention is not limited to the above described embodiments, but may comprise various modifications. For example, the engagement releasing mechanism may be constituted by a cum surface formed on the side of the cartridge holder 18 so that its forward side is disposed at the more outer side than its rear side and pins or projections sliding along this cam surface, these pins or projections being provided on the side of the retention lever. The engagement releasing mechanism may also be constituted by a cam surface formed on the rear surface of the retention lever 49 so that its rear side is disposed at the more outer side than its forward side and an engagement releasing pin provided on the cartridge holder 18 for registering with the cam surface.

The biasing means biasing the retention lever 49 of the disc cartridge attachment device may be constituted by means for rotationally biasing the retention lever 49 in a direction in which the engaging arm 52 is engaged with the engaging recess 11 and means separate from the biasing means for biasing the retention lever 49 in the disc cartridge inserting direction.

What is claimed is:

1. A disc cartridge loading device comprising
   a cartridge holder for holding a disc cartridge inserted therein,
   and ejection mechanism for shifting the disc cartridge in a discharging direction opposite to a disc cartridge inserting direction for discharging the disc cartridge out of said cartridge holder,
   a unitary retention lever supported on said cartridge holder for sliding movement relative to said cartridge holder in the inserting discharging directions and for rotation relative to said cartridge holder and having an engaging portion for pivoting into a retention opening in a side wall of said cartridge holder and engagement with an engaging recess provided in said disc cartridge,
   biasing means for biasing said retention lever in said inserting direction and into rotation in a direction in which said engaging portion engages in said engaging recess of said disc cartridge, and
   engagement releasing means for sliding said retention lever in the direction of discharging of said disc cartridge out of said cartridge holder and rotating said retention lever so that said engaging portion is pivoted out of said retention opening in the side wall of said cartridge holder and engagement between said engaging portion and said engaging recess is released.

2. A disc attachment device according to claim 1 wherein said engaging portion engaging said engaging recess in said disc cartridge comprises a bent portion formed at the foremost part of said retention lever in a direction normal to a length of said retention lever, said engaging portion facing an inside of said cartridge holder through said retention opening formed in said side wall of said cartridge holder.

3. A disc cartridge loading device according to claim 1 further comprising a supporting pin mounted on said cartridge holder and introduced into and supported by an elongated opening formed in said retention lever, said supporting pin and said elongated opening cooperating so that said retention lever slides in the inserting-discharging directions and rotates into and out of said retention opening in the side wall of said cartridge holder.

4. A disc cartridge loading device according to claim 3 wherein said retention lever is biased into rotation so that the engaging portion engaged in the engaging recess in said disc cartridge is directed towards an inside of said cartridge holder and into movement in the direction of inserting said disc cartridge into said cartridge holder by a torsion spring mounted between said retention lever and said cartridge holder.

5. A disc loading device according to claim 1 wherein said engagement releasing means comprises an engagement releasing pin formed on said cartridge holder and a cam section formed on one lateral side of said retention lever, said cam surface being thrust by said engagement releasing pin and said engaging portion being moved out of said cartridge holder by said retention lever being actuated in the direction of discharging of said disc cartridge out of said cartridge holder.

6. A disc cartridge loading device according to claim 5 wherein said engaging portion has a forward surface facing the disc cartridge inserted into said cartridge holder formed as an inclined guide surface and has a rear surface opposite to said inclined guide surface substantially normal to the disc cartridge inserting-discharging directions.

* * * * *